Nov. 23, 1954 — G. F. SARAZIN — 2,694,947

TORSIONAL VIBRATION DYNAMIC DAMPER

Original Filed June 20, 1949 — 3 Sheets-Sheet 1

INVENTOR
GILLES FRANÇOIS SARAZIN
BY
Bailey, Stephens & Huettig
ATTORNEYS

Nov. 23, 1954  G. F. SARAZIN  2,694,947
TORSIONAL VIBRATION DYNAMIC DAMPER
Original Filed June 20, 1949  3 Sheets-Sheet 2
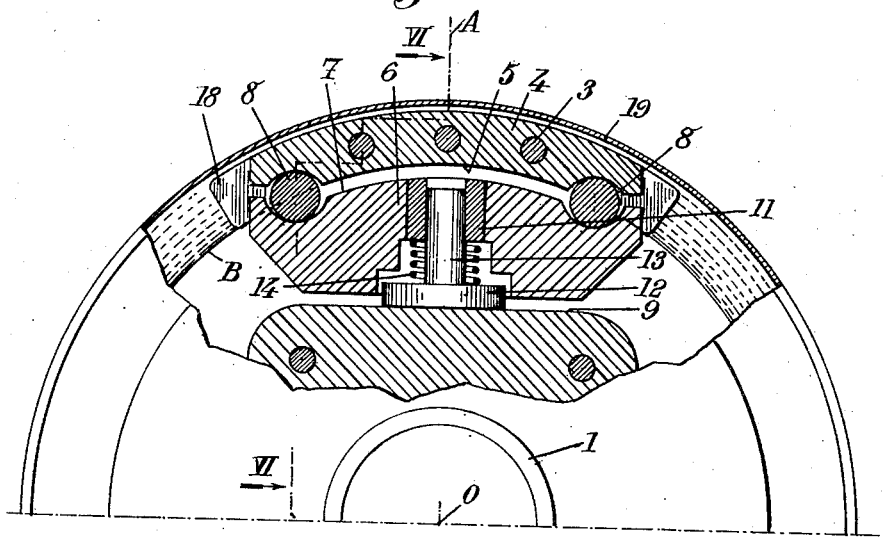
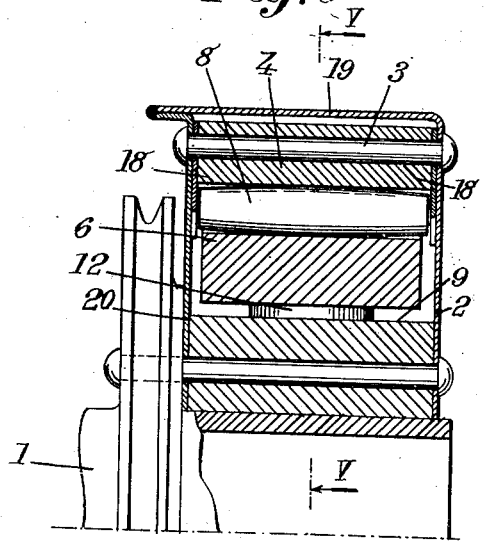
INVENTOR
GILLES FRANÇOIS SARAZIN
BY
ATTORNEYS

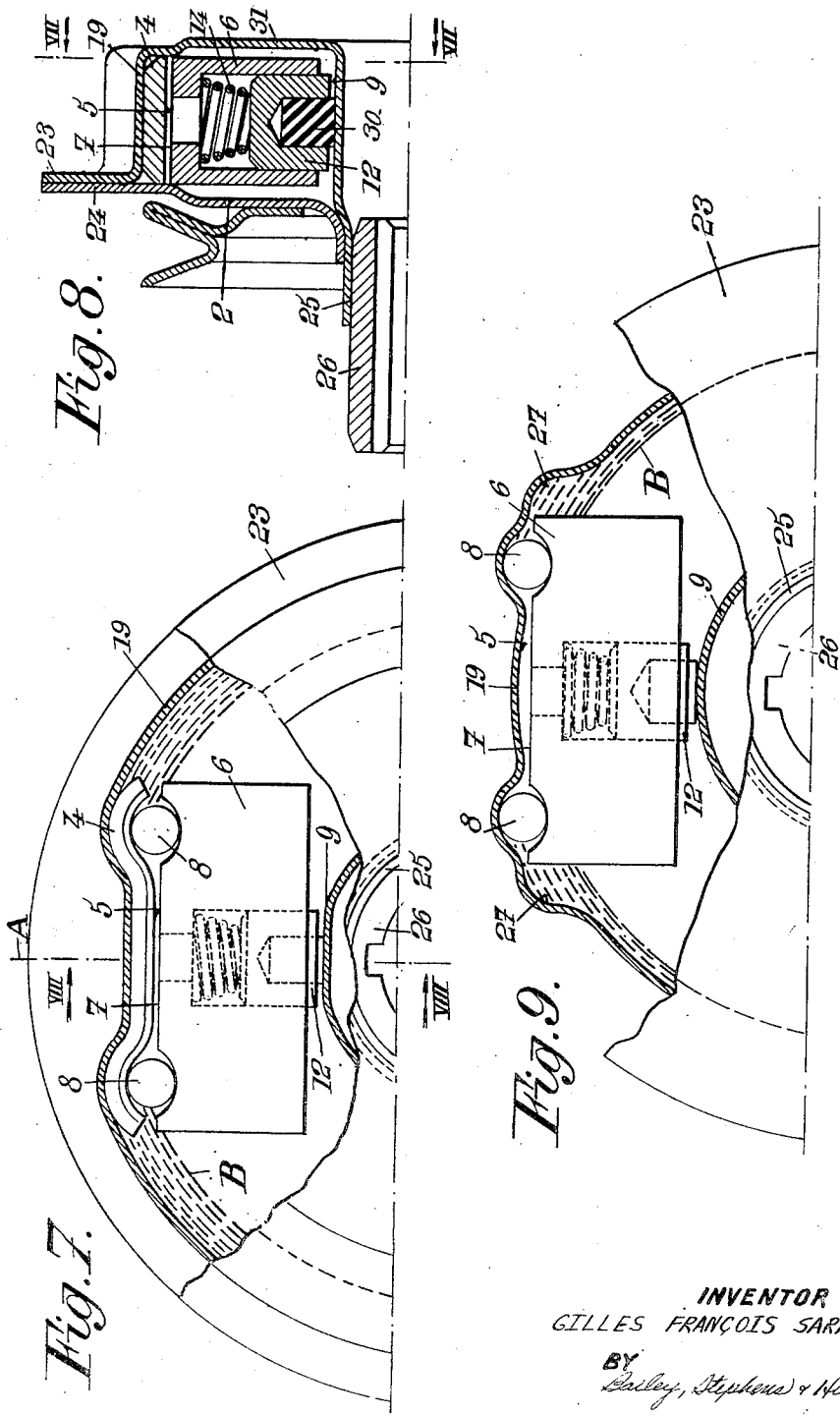

United States Patent Office 2,694,947
Patented Nov. 23, 1954

2,694,947

TORSIONAL VIBRATION DYNAMIC DAMPER

Gilles François Sarazin, Paris, France

Original application June 20, 1949, Serial No. 100,284. Divided and this application January 16, 1952, Serial No. 266,618

Claims priority, application France September 17, 1948

5 Claims. (Cl. 74—574)

The present invention, which is a division of my U. S. patent application Ser. No. 100,284, filed June 20, 1949, for "Improvements in Torsional Vibration Dynamic Dampers, of the Type Including Pendular Masses Without Return Spring, for Rotating Shafts," relates to torsional vibration dynamic dampers of the type including pendular masses without return spring, for rotating shafts.

These apparatus, which are well known at the present time, were initially described, both diagrammatically and according to certain embodiments, in the French patent to R. Sarazin, No. 724,234, of December 19, 1930, and in the addition thereto, No. 41,251, of June 30, 1931.

Subsequently, in the Swiss patent to R. Sarazin, No. 175,420, of September 1933, there was described an embodiment according to which the apparatus includes movable pendular masses connected to the vibrating part (shaft) through at least one rolling means running on the one hand on a race carried by the vibrating part and on the other hand on a race carried by the mass.

The present invention relates to these apparatus and its chief object is to provide a damper of this kind which is better adapted to meet the requirements of practice than those existing at the present time, in particular from the point of view of safety of operation and simplicity of construction.

It consists chiefly, while providing a rolling connection between the pendular mass of the apparatus and the vibrating part, in disposing, in an apparatus of the type above set forth, the roller races carried by the vibrating part in at least one element secured laterally to a disc or plate fixed on the shaft, the rolling means being made of a length substantially equal to the width of said element.

Other features of my invention will appear from the following detailed description of some specific embodiments thereof, with reference to the accompanying drawings, given merely by way of example, and in which:

Figs. 5 and 6 are views similar to Figs. 3 and 4 showing, in section on the line V—V of Fig. 6 and on the line VI—VI of Fig. 5, respectively, an apparatus made according to another embodiment of the invention;

Figs. 7 and 8 are views similar to Figs. 3 and 4 showing, in section on the line VII—VII of Fig. 8 and on the line VIII—VIII of Fig. 7, an apparatus made according to a third embodiment of the invention;

Fig. 9 shows, similarly to Fig. 7, an apparatus made according to a fourth embodiment of the invention.

Figure 1:
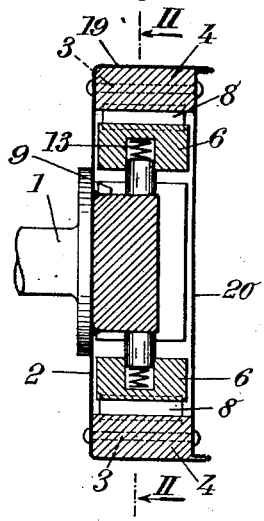
Figs. 1 and 2 show, respectively in axial section and in cross section on the line II—II of Fig. 1, a torsional vibration damper made according to the invention.
Figure 2:
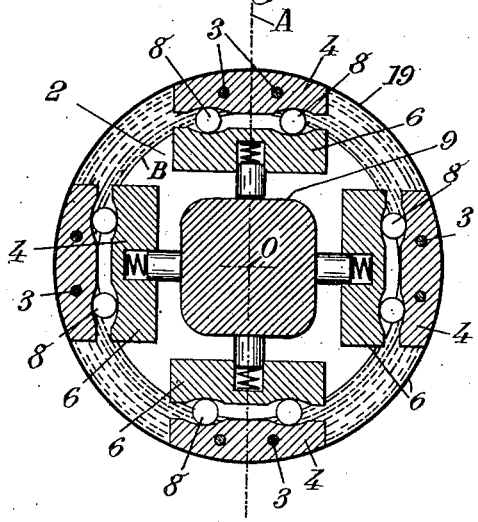

The embodiments of my invention to be hereinafter described are supposed to be applied to the case of a rotating shaft 1 subjected to the action of a periodically varying torsional perturbing influence.

I fix laterally to a disc 2 secured to shaft 1, for instance by means of rivets, or by welding, at least one element, and preferably, as shown, a plurality of blocks 4 distributed about the shaft, these blocks being, for instance, made of steel.

Each of these blocks is provided with a face 5, for instance of plane or cylindrical shape, parallel to the axis of rotation O of shaft 1 and disposed symmetrically with respect to the radial plane A passing through the middle line of said face 5.

This face 5 is provided with two roller races or tracks, each in the form of a portion of a cylinder of a radius equal to R (Fig. 4) and having its axis parallel to axis O, the axes of the two roller races thus formed being symmetrical with respect to plane A.

Opposite each block 4, there is provided a mass 6, for instance also made of steel, the face 7 of which includes, formed therein, roller races identical to those formed in block 4 and disposed at the same distance from each other as said first mentioned roller races.

I interpose, between the roller races of faces 5 and 7, two rollers 8 of a radius equal to $r$, each of these rollers cooperating with corresponding roller races of elements 4 and 6. These rollers may also be made of steel.

I thus obtain a bifilar pendular suspension of each mass 6 with a radius equal to $2(R-r)$, this pendular radius being chosen, as known, in such manner that the natural period of the pendulum thus constituted corresponds to a number $n$ of oscillations, for every revolution of shaft 1, equal to the order of the periodical torsional perturbation.

It should be noted that both blocks 4 and masses 6 may be obtained very simply by cutting from rolled bars of suitable section.

In order to prevent, when the system is at rest or is rotating at low speed, play from occurring between the rollers and their races, each of the masses is advantageously arranged to cooperate with a plunger engaged in a corresponding housing of said mass, a spring being interposed between the plunger and the bottom of said housing so that, as long as the centrifugal force exerted upon said mass is below a given value, this spring applies the outer face of the plunger against the surface 9 of a block fixed to plate 2 and made for instance of a plastic material, while pushing mass 6 toward block 4 so that rollers 8 are tightly held between their races.

Preferably the whole is arranged in such manner that the plunger, in its retracted position under the effect of the centrifugal force, however comes into contact with surface 9 when the pendular amplitude of the mass exceeds the maximum value to be admitted, for instance 30°. I thus prevent the rollers from escaping from their roller races.

The plungers may be made of any suitable material but, in view of their position, it is interesting to make them of a self-lubricating porous metal, in order to ensure lubrication thereof.

Advantageously, such a vibration damper is placed inside a fluidtight envelope, preferably in the form of a body of revolution, which contains an amount of lubricant such that, when the device is rotating, the roller races carried by the vibrating part are at least partly immersed in said lubricant.

The amount of lubricant introduced into the fluidtight envelope is advantageously chosen in such manner that when said lubricant is distributed, under the effect of the centrifugal force, in the form of a liquid annular body, the cylindrical free surface B (Fig. 4) materialized by the lubricant is so located that the rollers are at least partly immersed in the liquid, masses 6 however remaining, at least mostly, outside of the oil bath.

Figures 3, 4:
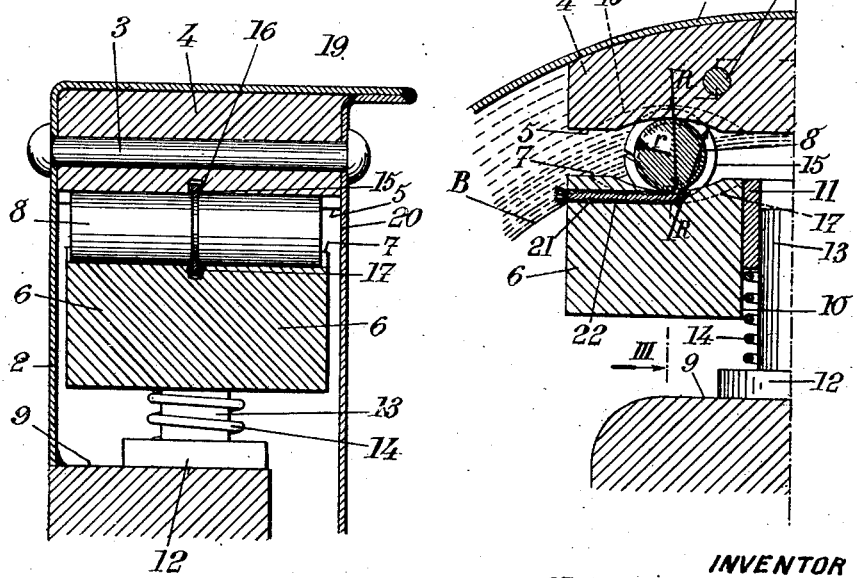
Figs. 3 and 4 are part views of the same apparatus on a larger scale, respectively in section on the line III—III of Fig. 4 and in section on the line II—II of Fig. 1.

Preferably, as shown by Figs. 3 and 4 on the one hand and 5 and 6 on the other hand, in order to constitute the housing of the plungers, each mass is provided with a bore 10 extending throughout it and a bronze ring 11 of a height smaller than that of the bore is fixed therein so that one edge of said ring is flush with the face 7 of the mass. The plunger includes a head 12 and a stem 13 adapted to slide freely in ring 11. A spring 14, wound round stem 13, is interposed between head 12 and the corresponding edge of the ring.

Now, according to my invention, while blocks 4 and masses 6 are of practically the same width (meaning their dimension parallel to the shaft axis) and their respective roller races extend practically continuously throughout said width, i. e. have lengths (meaning the lengths of the generatrices of their cylindrical surfaces) substantially equal to said width, the rollers 8 interposed between said races are also made of a length substantially equal to that of said races.

In order to prevent transverse displacements of the rollers and/or of the masses, these rollers are, in the construction of Figs. 3–4, provided each with an annular rib 15 projecting from the cylindrical surface of the roller and engaging with a certain play in corresponding grooves 16 and 17 provided in the roller races of the corresponding block and mass. This rib 15 may, for instance, be constituted by an elastically deformable split ring engaged in a peripheral groove cut in the middle plane of the roller.

In order to constitute the fluidtight envelope which is to contain the vibration damper, there is provided, at the periphery of disc 2, a cylindrical flange 19 which cooperates with a cover 20, for instance of sheet metal, so as to form a closed box inside which all the elements of the damper are contained.

Finally, if the free surface B of the liquid is supposed to be such that the zones of contact between the rollers and masses 6 are not immersed in the lubricant, I provide, as shown by Fig. 4, at least one channel 21 at either end of each mass 6, this channel opening at one of its ends into the lubricant and at the other end into the bottom of the adjacent roller race, a wick 22 being advantageously provided in this channel. Lubricant is thus conveyed to the zones of contact between the rollers and the masses.

The embodiment illustrated by Figs. 5 and 6 is practically the same as that of Figs. 3 and 4 with the difference that the means for preventing transverse displacements of the rollers and/or of the masses are constituted by plates 18 tightly held between each of the faces of blocks 4 and the walls of the fluidtight envelope.

These plates may be advantageously made of tempered steel, for instance in the form of plates 1 millimeter thick, chromium plated on the inner face (which is to act as a lateral abutment for the rollers and the masses).

They may also be constituted by ordinary metal sheets lined on their inner faces with plates of chromium plated spring steel.

These plates 18 are dimensioned to form lateral abutments for the rollers and/or the masses for all the positions that may be assumed by these elements in the course of the operation of the apparatus. Anyway, the rollers can then be constituted merely by tempered steel cylinders.

In the embodiment of Figs. 7 and 8, the blocks are constituted by a mere sheet metal plate of sufficient thickness (for instance 5 mm. thick) suitably shaped to provide the necessary roller races, this plate being applied and secured by electric welding against the inner face of the peripheral wall 19 of the fluidtight envelope. This wall 19 is itself shaped in such manner that, at the places where blocks 4 are to be fixed, these two elements (wall 19 and blocks 4) are applied intimately against each other.

In this construction, each plunger 12 is in the form of a cylindrical block sliding in a corresponding recess provided in mass 6, this plunger being pushed back by a spring 14.

An abutment 30, advantageously made of rubber coated with paraffin, is inserted in such manner in the corresponding plunger 12, that it prevents direct contact between plunger 12 and surface 9. I thus avoid any noise as would be produced by plunger 12 striking surface 9.

In this embodiment, the fluidtight envelope is constituted by the assembly of two sheet metal elements one of which 31 constitutes the inner peripheral wall, one of the radial faces and the outer peripheral wall of said envelope, this element also including a radial flange 23 through which it is assembled, by electric seam welding, with the other element 24, which constitutes only the second radial face of the fluidtight envelope. The inner peripheral wall has an extension 25 which constitutes a sleeve secured, through electric spot welding to an annular element 26 adapted to be fixed on the rotating shaft, this extension 25 being connected through electric seam welding with the inner edge of element 24.

According to this embodiment, both blocks 4 and masses 6 may advantageously be made of steel containing 0.4 per cent of carbon, blocks 4 being obtained in a press and masses 6 being constituted by sections of a bar, the roller races being merely broached without thermal treatment.

According to this embodiment, the means for preventing transverse displacements of the rollers are very simply constituted by peripheral bosses constituted when stamping the walls of the fluidtight envelope.

Thus, this envelope limits an inner chamber in the form of a body of revolution the section of which, as shown by Fig. 8, is some millimeters narrower in its peripheral zone than in the remainder of this chamber. In this peripheral zone, the transverse abutments necessary for the rollers and for the peripheral portions of the masses are constituted by the walls of the fluidtight envelope, whereas the body of said masses moves in a wider space and is thus sufficiently spaced apart from the peripheral envelope.

Finally, the embodiment according to Fig. 9 is identical to the preceding one, with the only difference that the function of blocks 4 is fulfilled by the peripheral wall 19 of the fluidtight envelope, so that blocks 4 can be dispensed with. The roller races for rollers 8 are in this case obtained directly by stamping of wall 19. If necessary, supplementary bosses 27 are provided for affording room for the oscillations of masses 6.

Of course, rollers 8, instead of being of strictly cylindrical shape, as shown by Figs. 1 to 4, may have slightly convex generatrices, as shown by Fig. 6.

The rollers, or the elements forming the roller races, may be made of a self-lubricating porous metal.

The roller races, instead of having a circular-shaped generatrix, might have a generatrix of any suitable shape.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A vibration damper for use on a rotating shaft which comprises, in combination, a plate rigid with said shaft extending transversely thereto, a support rigid with said plate extending wholly on one side thereof in a direction parallel to said shaft, at least one part rigid with said support disposed on one side of said shaft, said part being symmetrical about a plane passing through the axis of said shaft and being provided, in its face turned toward said axis, with two roller races located respectively on either side of said plane of symmetry and in the form of cylindrical surfaces concave toward said axis and having their generatrices parallel to said axis, these generatrices extending over at least practically the whole width of said part, at least one pendular mass located opposite said part and provided with two roller races located opposite the respective roller races of said part, the roller races of said pendular mass being in the form of cylindrical surfaces concave toward said part and having their generatrices parallel to the shaft axis and extending over practically the whole width of said pendular mass, which width is at least practically equal to the width of said part, and cylindrical rollers interposed between each roller race of said part and the corresponding roller race of the pendular mass located opposite said part, the generatrices of the cylindrical surfaces of said rollers being parallel to the shaft axis and of a length at least practically equal to the width of said part and said mass.

2. A vibration damper for use on a rotating shaft which comprises, in combination, a plate rigid with said shaft extending transversely thereto, a support rigid with said plate extending wholly on one side thereof in a direction parallel to said shaft, at least one part rigid with said support disposed on one side of said shaft, said part being symmetrical about a plane passing through the axis of said shaft and being provided, in its face turned toward said axis, with two roller races located respectively on either side of said plane of symmetry and in the form of cylindrical surfaces concave toward said axis and having their generatrices parallel to said axis, these generatrices extending over at least practically the whole width of said part, at least one pendular mass located opposite said part and provided with two roller races located opposite the respective roller races of said part, the roller races of said pendular mass being in the form of cylindrical surfaces concave toward said part and having their generatrices parallel to the shaft axis and extending over practically the whole width of said pendular mass, which width is at least practically equal to the width of said part, cylindrical rollers interposed between each roller race of said part and the corresponding roller race of the pendular mass located opposite said part, the generatrices of the cylindrical surfaces of said rollers being parallel to the shaft axis and of a length at least practically equal to the width of said part and said mass, and means for preventing relative displacement of said rollers with respect to said races in a direction parallel to the generatrices thereof.

3. A vibration damper according to claim 2, in which the last mentioned means include an annular circular rib projecting from the surface of every roller, the corresponding races of said part and said mass which cooperate with this roller being provided with curved grooves adapted to accommodate said rib.

4. A vibration damper according to claim 2 in which said last mentioned means include plates carried by said part on both sides thereof and perpendicular to the shaft axis.

5. A vibration damper for use on a rotating shaft which comprises, in combination, a disc rigid with said shaft extending at right angles to the axis thereof, a cylindrical casing coaxial with said shaft rigid with said disc and located wholly on one side thereof, a plurality of blocks rigid with the inner wall of said casing forming in the peripheral portion thereof a circumferential row about said axis and each symmetrical about a plane passing through said axis, each block being provided, in its face turned toward said shaft axis, with two roller races located respectively on either side of said plane of symmetry and in the form of cylindrical surfaces concave toward said axis and having their generatrices parallel to said axis, these generatrices being at least practically of the same length as those of said cylindrical casing, a plurality of pendular masses forming a circumferential row about the axis of said shaft inside the circumferential row formed by said blocks, each pendular mass being located opposite one block and being provided with two roller races located opposite the roller races of said last mentioned block, respectively, the roller races of each pendular mass being in the form of cylindrical surfaces concave toward the corresponding block and having their generatrices parallel to the shaft axis and of a length equal to that of the above mentioned generatrices, cylindrical rollers interposed between each roller race of one block and the corresponding roller race of the pendular mass located opposite said last mentioned block, the generatrices of the cylindrical surfaces of said rollers being parallel with the shaft axis and of a length at least practically equal to those of the above mentioned generatrices, and means for preventing substantial longitudinal displacement of said rollers with respect to said races.

References Cited in the file of this patent

UNITED STATES PATENTS

| Number | Name | Date |
|---|---|---|
| 2,121,950 | Chilton | June 28, 1938 |
| 2,213,417 | Stumpp | Sept. 3, 1940 |
| 2,348,941 | Ware | May 16, 1944 |
| 2,359,180 | Williams | Sept. 26, 1944 |

FOREIGN PATENTS

| Number | Country | Date |
|---|---|---|
| 849,359 | France | Aug. 11, 1939 |